June 2, 1970    MOTOHARU NISHIMURA    3,515,592

DEEP SUBMERGENCE STORAGE BATTERY

Filed Sept. 11, 1968

INVENTOR

Motoharu Nishimura

BY

Watson, Cole, Grindle & Watson

ATTORNEY

United States Patent Office 3,515,592
Patented June 2, 1970

3,515,592
DEEP SUBMERGENCE STORAGE BATTERY
Motoharu Nishimura, Takatsuki, Japan, assignor to Yuasa Battery Company Limited, Osaka, Japan
Filed Sept. 11, 1968, Ser. No. 759,140
Int. Cl. H01m 35/00
U.S. Cl. 136—6                                       5 Claims

ABSTRACT OF THE DISCLOSURE

This invention relates to a deep submergence storage battery in which battery elements such as plate groups, separator, etc. are completely isolated from the sea water by forming between the electrolyte and the sea water a medial liquid layer intermediate in specific gravity between the two. The top and part of the upper lateral sides of the battery elements are protected with a cover, and when the storage battery is swung or inclined during use in the sea, the medial liquid layer does not directly contact the battery elements and accordingly can prevent deterioration in performance of the storage battery.

---

This invention relates to a deep submergence storage battery.

A known type storage battery heretofore used in the sea and proposed as deep submergence power supply was a storage battery in which there was provided a liquid layer between an electrolyte and sea water, said liquid layer being an electric insulating liquid layer smaller in specific gravity than the two, and the battery and the liquid layer being contained in an outer box. The outer box is provided with a cock for exhausting a gas produced during use into the sea water around the outer box or a special exhausing means for the passage of the gas alone. In the former, the opening and closing operation of the cock is complicated and in the latter, the ability of exhausting a gas when used in the sea is not sufficient. Furthermore, there was the disadvantage that the mechanisms of the two made it necessary to make the inside and outside of the outer box equal in water pressure and accordingly made the structure of the battery complicated. This invention has eradicated all the disadvantages of the kind described above.

A primary object of this invention is to provide a deep submergence storage battery suitable for industrial application and long-termed service.

Another object of the invention is to provide a deep submergence storage battery capable of safely operating when swung and inclined in the sea.

Still another object of the invention is to provide a deep submergence storage battery that is simple in structure and low cost.

Figure 1:
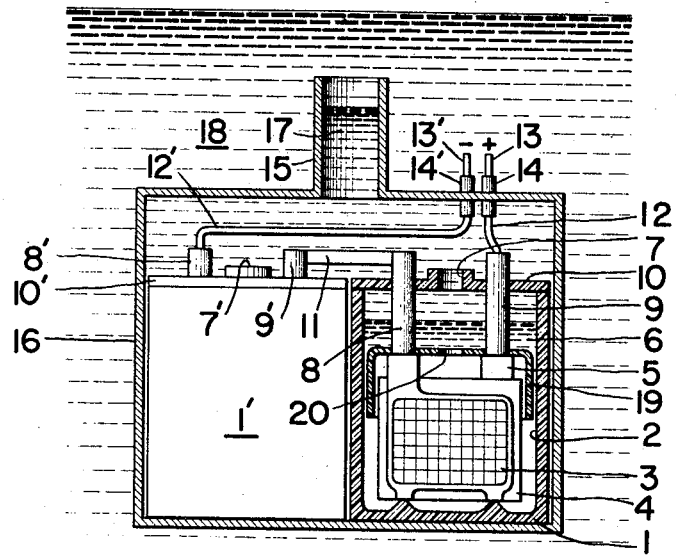
Figure 2:
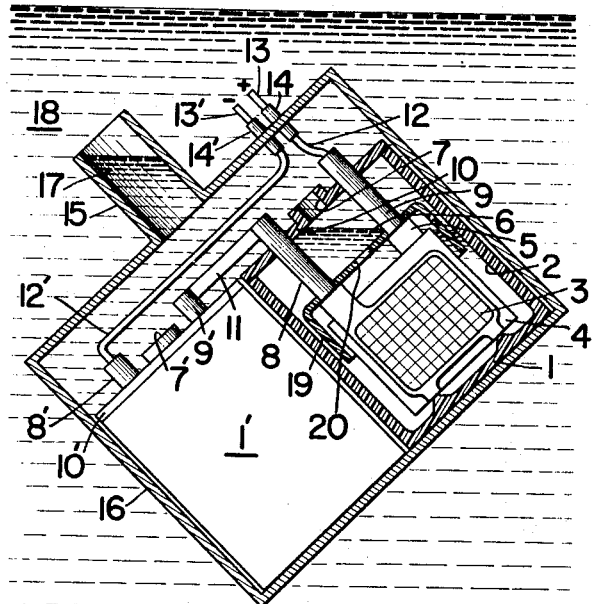

These and other objects of the invention will become more apparent from the following description taken in conjunction with the accompanying drawing in which:

FIG. 1 is a front view, partly in longitudinal section, of the deep submergence storage battery in embodiment of this invention; and FIG. 2 is a deep submergence storage battery similar to that shown in FIG. 1, showing the state in which the battery is swung and inclined during use.

Referring now to the drawing, cells 1 and 1' both are contained in a cell jar 2 made of synthetic resin or ebonite, each of said cells containing therein battery elements such as a negative plate group 3, a glass mat separator 4, a positive plate group 5, an electrolyte 6 and comprising cell covers 10, 10' which have openings 7 and 7' in the center thereof and have poles 8, 8' and 9, 9' passing through the covers connecting the negative group 3 to the positive group 5, respectively pass. The poles 8 and 9' are electrically connected in series by a conductor 11. The pole 9 of the cell 1 and the pole 8' of the cell 1' have lead wires 12 and 12' attached thereto, respectively, and terminals 13 and 13' are provided at the other ends of the lead wires 12 and 12' and fixed to an outer box 16 through insulators 14 and 14', said outer box being later described.

These two cells constitute a lead-acid type storage battery of a conventional structure. The cells are received in an outer box 16 having an opening cylinder 15 which is open at one end and protrudes upwardly from the center of the outer box. As shown, there is filled a medial liquid layer 17 in the area extending from the upper portion of the electrolyte to the upper end of the opening cylinder 15 of the outer box 16. Around the outer box 16 there is sea water 18. The medial liquid layer 17 is made of a substance that is smaller in specific gravity than the electrolyte (specific gravity 1.20–1.30) and larger than sea water (specific gravity 1.03). Especially, a liquid layer of the order of 1.08 in specific gravity is desirable. The other conditions required of the property of this liquid layer 17 are that the liquid layer 17 is not dissolved in the electrolyte or in sea water and has electric insulating property and, according to experiments, a viscosity of 10–1500 cs. (centistoke) at working temperature. Particularly, experiments show that the optimum viscosity for the liquid layer 17 is 20–1000 cs. This optimum viscosity has the advantage that it does not obstruct the escape of the gas generated in the storage battery nor releases the electrolyte into the sea but is effective for the prevention of the passage of sea water. As the material for use as the medial liquid layer 17 are recommended synthetic oils such as spindle oil, refrigerator oil, dynamo oil, turbine oil, cylinder oil, transformer oil, chlorinated diphenyl oil, fluorine oil, silicone oil, etc. These materials may be used singly or in mixture, whereby the materials that meet the requirements described above can be obtained.

One of the other important characteristics of the invention is that a protective cover 19 having a gas exhaust opening 20 in the center thereof is positioned below the electrolyte surface so as to protect the top and side portions of the battery elements such as the negative and positive plates, separator, etc. This protective cover 19 is made preferably of a material such as synthetic resin, capable of resisting the medial liquid layer 17 made of one of the oil substances described above and also resisting the electrolyte.

As shown in FIG. 2, when the storage battery is inclined in the sea under the influence of waves, the medial liquid layer 17 is prevented by the cover 19 from coming into contact with the battery elements, particularly the negative and positive groups.

In short, this invention is designed to prevent the electrolyte and sea water from coming into direct contact with each other by retaining a medial liquid between the electrolyte and the sea water, said medial liquid being smaller than the electrolyte and larger than the sea water in specific gravity in order that the electrolyte may not directly contact the sea water and is mixed therewith, and is constructed to provide a protective cover for the prevention of an oil substances from coming into contact with the battery elements, particularly plate groups, even when the storage battery is inclined in the sea. The medial liquid layer having a suitable range of viscosity does not obstruct the escape of the gas generated in the storage battery. Further, the outer box that is made strong enough to resist the deformation due to outside pressure allows the use of the battery of the invention in the deep sea. Furthermore, it is possible to use a cell jar formed integrally with a protective plate cover adhered to the inner surface of the jar containing the battery elements.

While the embodiment of this invention has been illustrated by way of example in the drawing and particularly described, it will be understood that various changes and modifications may be made in the invention without departing from the scope and spirit of the invention.

What is claimed is:

1. A deep submergence battery comprising an outer box; a cell jar in said outer box containing battery elements including negative and positive plate groups, separators and liquid electrolyte; and in the cell jar a medial liquid layer in contact with and covering the top surface of said electrolyte, said medial liquid layer having a specific gravity less than that of said liquid electrolyte and greater than that of sea water and being immiscible in said electrolyte and sea water whereby when said battery is immersed in sea water said sea water is maintained on the top surface of said media liquid layer preventing the passage of sea water into the liquid electrolyte and release of the liquid electrolyte into the sea water.

2. A deep submergence storage battery according to claim 1 wherein said medial liquid layer is an oil substance having a viscosity in the range of 10–1500 cs.

3. A deep submergence storage battery according to claim 1 further comprising a protective cover positioned above said battery elements but below the top surface of said liquid electrolyte, said protective cover having therein a port permitting gas emitted by said battery elements to pass therethrough.

4. A deep submergence storage battery according to claim 1 wherein said outer box includes a top cover having a port therein and an open cylinder extending upwardly therefrom whereby said medial liquid layer comes in contact with the sea water through said cylinder when said battery is submerged.

5. A deep submergence storage battery according to claim 1 wherein the specific gravity of said medial liquid is about 1.08.

References Cited

UNITED STATES PATENTS

| | | | |
|---|---|---|---|
| 2,930,828 | 3/1960 | Herold | 136—6 |
| 3,160,525 | 12/1964 | Hutchison et al. | 136—6 |
| 3,166,446 | 1/1965 | Hutchison | 136—6 |
| 3,304,202 | 2/1967 | Sam | 136—6 |

WINSTON A. DOUGLAS, Primary Examiner

F. F. LEFEVOUR, Assistant Examiner

U.S. Cl. X.R.

136—83